US008763990B2

(12) United States Patent
Day

(10) Patent No.: US 8,763,990 B2
(45) Date of Patent: Jul. 1, 2014

(54) TURN STABILITY SYSTEMS AND METHODS FOR LIFT TRUCKS

(75) Inventor: Richard M. Day, Port Crane, NY (US)

(73) Assignee: The Raymond Corporation, Greene, NY (US)

( * ) Notice: Subject to any disclaimer, the term of this patent is extended or adjusted under 35 U.S.C. 154(b) by 231 days.

(21) Appl. No.: 13/424,886

(22) Filed: Mar. 20, 2012

(65) Prior Publication Data
US 2013/0248787 A1    Sep. 26, 2013

(51) Int. Cl.
*B66F 9/075* (2006.01)

(52) U.S. Cl.
USPC .................. 254/2 R; 254/2 B; 254/2 C

(58) Field of Classification Search
CPC ...... B66F 9/07559; B66F 9/075; B66F 3/247; B66F 3/38; B66F 7/08; B66F 9/07563; B66F 7/16; B62D 1/00; B62D 21/00; B62D 47/00
USPC ......... 254/2 R–8 R, 2 B, 2 C; 180/19.1, 19.2, 180/19.3, 253, 252, 23
See application file for complete search history.

(56) References Cited

U.S. PATENT DOCUMENTS

| | | | |
|---|---|---|---|
| 2,438,571 A * | 3/1948 | Maxon, Jr. | 280/43 |
| 2,614,643 A * | 10/1952 | Quayle | 180/21 |
| 2,982,395 A | 5/1961 | Rados | |
| 3,031,024 A | 4/1962 | Ulinski | |
| 3,067,839 A | 12/1962 | Gibson | |
| 3,504,889 A | 4/1970 | Wyrough | |
| 3,672,634 A | 6/1972 | Chaffin | |
| 3,918,597 A | 11/1975 | Lee | |
| 4,037,739 A | 7/1977 | Lee | |
| 4,509,127 A | 4/1985 | Yuki et al. | |
| 4,530,492 A | 7/1985 | Bork | |
| 4,534,433 A * | 8/1985 | Burbank et al. | 180/19.1 |
| 4,771,531 A * | 9/1988 | Asher | 29/426.3 |
| 5,020,825 A | 6/1991 | Lizell | |
| 5,107,969 A | 4/1992 | Klein et al. | |
| 5,269,501 A | 12/1993 | Liegel et al. | |
| 5,289,902 A | 3/1994 | Fujita | |
| 5,338,015 A | 8/1994 | Liegel et al. | |

(Continued)

FOREIGN PATENT DOCUMENTS

| | | |
|---|---|---|
| CN | 2889874 Y | 4/2007 |
| DE | 957377 C | 1/1957 |

(Continued)

OTHER PUBLICATIONS

Minav, T.A. et al. "Electric energy recovery system efficiency in a hydraulic forklift." IEEE EUROCON, 2009: pp. 758-765.

(Continued)

*Primary Examiner* — George Nguyen
(74) *Attorney, Agent, or Firm* — Quarles & Brady LLP

(57) ABSTRACT

A lift truck includes systems and methods for improved stability control while turning, including a rotatable drive unit having a steerable drive tire. A first slide mechanism is coupled to the rotatable drive unit, and a second slide mechanism is mounted to a caster plate. A steering mechanism coupled to the rotatable drive unit is moved to steer the steerable drive tire, causing the first slide mechanism to interact with the second slide mechanism and to produce a downward pressure and/or reduce the downward pressure on a caster mounted to the caster plate.

19 Claims, 6 Drawing Sheets

(56) References Cited

U.S. PATENT DOCUMENTS

| | | | |
|---|---|---|---|
| 5,480,275 A * | 1/1996 | Talbert et al. | 414/635 |
| 5,579,859 A | 12/1996 | Quellhorst et al. | |
| 5,628,377 A | 5/1997 | Le Gloan | |
| 5,647,600 A | 7/1997 | Booras | |
| 5,722,504 A * | 3/1998 | Gaetani | 180/411 |
| 5,781,873 A | 7/1998 | Sasaki | |
| 5,853,181 A | 12/1998 | Booras | |
| 5,878,851 A | 3/1999 | Carlson et al. | |
| 5,993,358 A | 11/1999 | Gureghian et al. | |
| 6,226,558 B1 | 5/2001 | Schneider et al. | |
| 6,236,927 B1 | 5/2001 | Sherman | |
| 6,279,199 B1 | 8/2001 | Plate | |
| 6,499,184 B2 | 12/2002 | Plate | |
| 6,517,094 B1 | 2/2003 | Kincaid | |
| 6,601,825 B2 | 8/2003 | Bressner et al. | |
| 6,688,631 B1 | 2/2004 | Andre | |
| 6,847,874 B2 | 1/2005 | Stiller | |
| 7,008,166 B1 | 3/2006 | Grimes | |
| 7,017,228 B2 | 3/2006 | Silverstein et al. | |
| 7,070,028 B2 | 7/2006 | Reybrouck et al. | |
| 7,073,643 B2 | 7/2006 | Schel | |
| 7,121,372 B2 | 10/2006 | Braud | |
| 7,243,904 B1 | 7/2007 | Grimes | |
| 7,413,062 B2 | 8/2008 | Vandewal | |
| 7,593,797 B2 | 9/2009 | Izawa et al. | |
| 7,770,904 B2 | 8/2010 | Passeri | |
| 7,823,862 B2 * | 11/2010 | Wakil | 254/8 R |
| 7,896,358 B2 | 3/2011 | Hoff | |
| 7,905,555 B2 | 3/2011 | Huntimer | |
| 8,140,228 B2 | 3/2012 | McCabe et al. | |
| 2006/0138733 A1 | 6/2006 | Clauson | |
| 2006/0182578 A1 | 8/2006 | Morton | |
| 2006/0231312 A1 | 10/2006 | Passeri | |
| 2007/0056141 A1 | 3/2007 | Armano et al. | |
| 2007/0231113 A1 | 10/2007 | McGurn | |
| 2008/0006494 A1 | 1/2008 | Vandewal | |
| 2009/0082925 A1 | 3/2009 | Wijffels et al. | |
| 2009/0166989 A1 | 7/2009 | Atsushi | |
| 2009/0312875 A1 | 12/2009 | Lehtonen et al. | |
| 2010/0230913 A1 | 9/2010 | Peterson | |
| 2011/0243699 A1 | 10/2011 | Kleeberger et al. | |
| 2012/0101627 A1 | 4/2012 | Lert | |

FOREIGN PATENT DOCUMENTS

| | | |
|---|---|---|
| DE | 19641192 | 3/1998 |
| DE | 19641192 A1 | 3/1998 |
| DE | 102004048519 | 3/2006 |
| DE | 102005053264 | 5/2007 |
| DE | 102008020595 | 10/2009 |
| EP | 0890462 A1 | 1/1999 |
| EP | 0921095 A2 | 6/1999 |
| EP | 0931758 A1 | 7/1999 |
| EP | 1172277 A2 | 1/2002 |
| EP | 1588979 | 10/2005 |
| EP | 1588979 A2 | 10/2005 |
| EP | 1975114 | 10/2008 |
| EP | 1975114 A1 | 10/2008 |
| EP | 2022749 | 2/2009 |
| EP | 2053013 A2 | 4/2009 |
| EP | 2081822 | 7/2009 |
| GB | 2379434 A | 3/2003 |
| JP | 57160708 | 10/1982 |
| JP | S58167214 A | 10/1983 |
| JP | 06263145 | 9/1994 |
| JP | 07315518 | 12/1995 |
| JP | 09086610 | 3/1997 |
| JP | 9145552 | 6/1997 |
| JP | H11 100200 A | 4/1999 |
| JP | 11301233 | 11/1999 |
| JP | H11301233 A | 11/1999 |
| JP | 2000 062428 A | 2/2000 |
| JP | 2000 238999 A | 9/2000 |
| JP | 2002370899 A | 12/2002 |
| JP | 2004001941 A | 1/2004 |
| JP | 2004269236 | 9/2004 |
| JP | 2008081261 | 4/2008 |
| JP | 2008081261 A | 4/2008 |
| WO | 2008006928 | 1/2008 |

OTHER PUBLICATIONS

Guang-zhao Cui et al. "A robust autonomous mobile forklift pallet recognition." 2nd International Asia Conference on Informatics in Control, Automation and Robotics (CAR). Volume 3, 2010: pp. 28+.

Keum-Shik Hong et al. "Navigation Function-Based Control of Multiple Wheeled Vehicles." IEEE Transactions on Industrial Electronics. vol. 58, Issue 5, 2011: pp. 1896-1906.

Hoefinghoff, J.F. et al. "Using 3D Field Simulation for Evaluating UHF RFID Systems on Forklift Trucks." IEEE Transactions on Antennas and Propagation. vol. 59, Issue 2, 2011: pp. 689-691.

"Active Sway Control cuts picking times down to size." http://www.ethiopianreview.com/articles/120808. Dated Nov. 4, 2010.

"Sway Control." http://www.hsmsearch.com/stories/articles/-/handling_storing/warehouse_safety/sway_control/. Dated Jun. 1, 2011.

"Rocla's new innovation brings more intelligence into warehouse trucks and improves user comfort." http://www.rocla.com/news.asp?Section=4058,Item=5309. Dated 2012.

Zimmert, Nico et al. "Active Damping Control for Bending Oscillations of a Forklift Mast Using Flatness based Techniques." Journal Article. Dated Jun. 2010. American Control Conference. pp. 1538-1543.

Kullaa, Jyrki. "Active Control of a Mast Structure Using Support Excitation." European Congress on Computational Methods in Applied Sciences and Engineering. Dated Jul. 2004. pp. 1-14.

Machine Translated JP 11-100200 A (Komatsu Forklift) Apr. 12, 1999.

Machine Translated JP 2000-062428 A (Toyota Automatic Loom Works) Feb. 29, 2000.

* cited by examiner

TURN STABILITY SYSTEMS AND METHODS FOR LIFT TRUCKS

CROSS-REFERENCE TO RELATED APPLICATIONS

Not applicable.

STATEMENT CONCERNING FEDERALLY SPONSORED RESEARCH OR DEVELOPMENT

Not applicable.

FIELD OF THE INVENTION

The present invention relates to the field of industrial lift trucks, and more specifically to systems and methods for improved turning stability control for lift trucks.

BACKGROUND OF THE INVENTION

Attempts have been made to enhance the turning or cornering stability of a lift truck by using stiff springs in castor wheels set at high pressure in order to make the truck more stable. But, use of stiff springs can also reduce the operator's comfort by allowing the operator to feel more bumps. Other stability enhancement mechanisms lock up the truck suspension in order to enhance truck stability when turning, but with similar results.

For example, referring to FIG. 1, a simplified front view of a lift truck 20 is shown using spring loaded casters 22 and a center drive tire 24 spaced between the two spring loaded casters 22. The spring loaded casters allow for lift truck turning and driving over rough floors 26 while still maintaining a smooth ride and good contact force for the drive tire 24. Typically, the casters 22 are adjusted to find an optimum operation between drive tire slippage and the truck rocking or tilting between both casters.

Other varieties of lift truck configurations use spring loaded casters and include a shock absorber 30 for damping. The addition of damping allows for softer springs, which reduces the rate of outward roll, but not the magnitude of the roll. Nevertheless, when the lift truck turns sharply, the damper responds to the high speed motion of the caster by generating a force and may still tilt the truck because the damper force is a function of caster motion, not truck roll. When the damper reacts in this way, it reduces operator comfort and diminishes the advantages of softer springs.

Referring to FIG. 2, still other varieties of lift truck configurations use fixed casters 34 and a suspended drive tire 36. This configuration lets the suspension spring 38 provide enough force to keep the suspended drive tire 36 in contact with the floor, and is more prevalent with very flat floors. Yet, on rough floors, operators of a truck with this configuration are known to feel oscillations and the truck may tilt on most every bump. Also, the effect of hitting an object with one caster may cause a noticeable contact and tilt felt by the operator.

At best, all of these previous configurations only improve the tradeoff between soft springs and the truck tilting (rolling or swaying while turning) versus hard springs, and truck dampers that limit the performance of the spring only caster configurations. If the spring tension of the caster could be adjusted during a turn, the truck would then be capable of turning without swaying and maintaining comfort for the operator.

What is needed are systems and methods for enhancing the steering performance by adjusting the caster spring tension in a turn, yet without sacrificing vehicle performance, cornering ability and/or operator comfort.

SUMMARY OF THE INVENTION

The present invention overcomes the drawbacks of the previous lift truck systems and methods by providing stability control features to reduce or eliminate swaying of the truck away from a turn or bank into a turn.

In accordance with one embodiment of the invention, a system for stabilizing a lift truck is disclosed. The system comprises a rotatable drive unit, the drive unit including a steerable drive tire. A first slide mechanism is coupled to the rotatable drive unit. A caster is mounted to a caster plate, with a second slide mechanism mounted to the caster plate. A steering mechanism is coupled to the rotatable drive unit, such that when the steering mechanism is moved to steer the steerable drive tire, the first slide mechanism interacts with the second slide mechanism to affect a pressure on the caster.

In accordance with another embodiment of the invention, a system for stabilizing a lift truck is disclosed. The system comprises a rotatable drive unit, the drive unit including a steerable drive tire. A left side slide mechanism and a right side slide mechanism are coupled to the rotatable drive unit. A left caster is mounted to a left caster plate, and a right caster is mounted to a right caster plate. A left caster slide mechanism is mounted to the left caster plate, and a right caster slide mechanism is mounted to the right caster plate. A steering mechanism is coupled to the rotatable drive unit, such that when the steering mechanism is moved to turn the lift truck to the left, the right side slide mechanism interacts with the right caster slide mechanism to produce a downward pressure on the right caster.

In accordance with yet another embodiment of the invention, a method for stabilizing a lift truck is disclosed. The method comprises the steps of providing a rotatable drive unit, the drive unit including a steerable drive tire; providing a first slide mechanism coupled to the rotatable drive unit; providing a caster mounted to a caster plate; providing a second slide mechanism mounted to the caster plate; providing a steering mechanism coupled to the rotatable drive unit, the steering mechanism for steering the steerable drive tire and causing the first slide mechanism to interact with the second slide mechanism; and affecting a pressure on the caster.

The foregoing and other objects and advantages of the invention will appear in the detailed description which follows. In the description, reference is made to the accompanying drawings which illustrate preferred embodiments.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The various aspects of the invention will be described in connection with improved turning stability of industrial lift trucks. That is because the features and advantages that arise due to embodiments of the invention are well suited to this purpose. Still, it should be appreciated that the various aspects of the invention can be applied to achieve other objectives as well.

Embodiments of the invention described herein, either alone or in combination, are well suited to provide a stabilized lift truck. The truck achieves improved turning stabilization through one or more individual or combined improvements that are configured to minimize side to side motion caused by vehicle turning. The collective improvements provide a simple mechanical solution, and allow greater productivity by permitting faster travel speeds.

Figure 1:
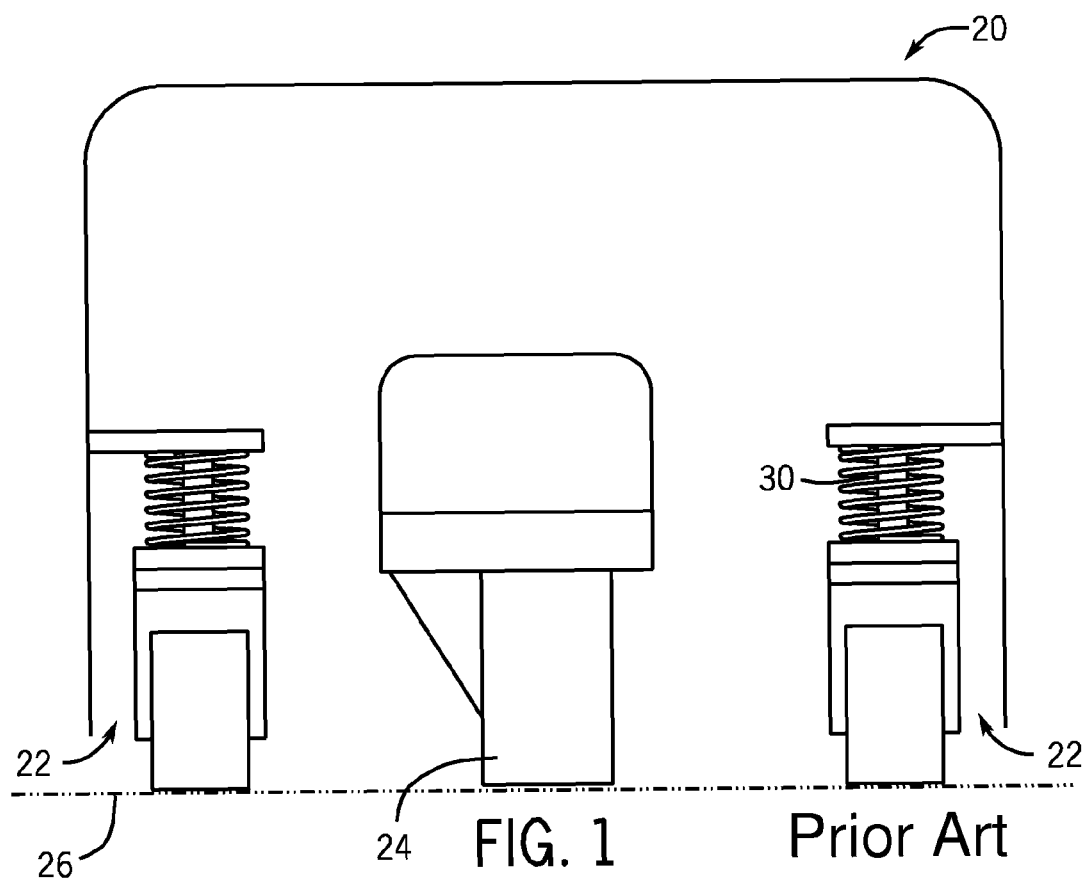
FIG. 1 is a front view of a lift truck, showing known spring loaded caster configurations.
Figure 2:
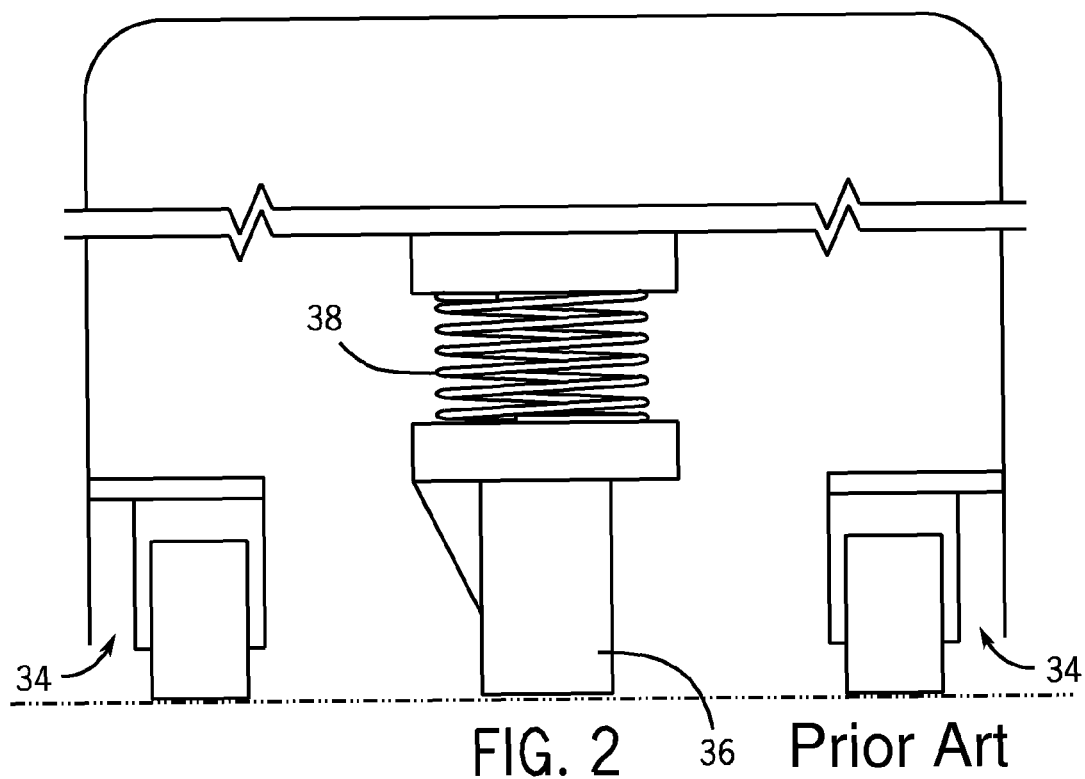
FIG. 2 is a front view of a lift truck similar to the truck of FIG. 1, except showing a known fixed caster configuration with a suspended traction wheel.
Figure 3:
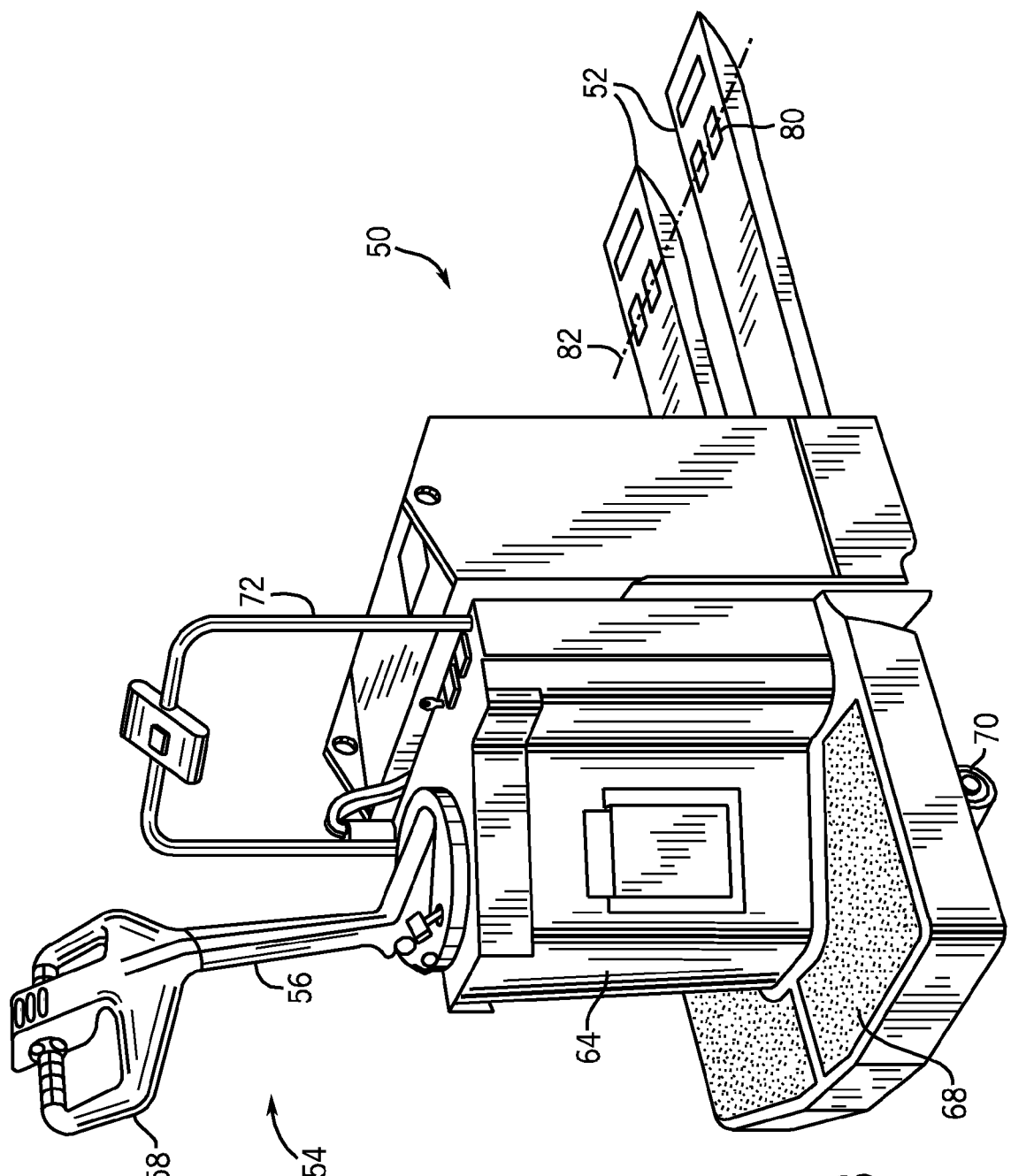
FIG. 3 is perspective view of a lift truck including embodiments of the invention.

Referring now to the Figures, and more particularly to FIG. 3, one embodiment of a lift truck 50 that incorporates the present invention is shown. FIG. 3 depicts a hand/rider truck 50 having load bearing forks 52 and a steering control mechanism 54 that includes a movable steering arm 56 and steering arm handle 58. The truck 50 is also provided with a drive unit 60 including a traction motor 62 (see FIG. 4) enclosed in a motor housing 64, and a steerable drive tire 66 (see FIG. 5) located under a platform 68. The drive unit 60 is shown to be generally centered along centerline 118. The truck 50 is also shown with stabilizing casters 70, and a hand rail 72 that can be grasped by a riding operator standing on the platform 68.

The drive unit 60 is coupled to the steering mechanism 54. The steering mechanism 54 is rotatable to the right and left to change the direction of the lift truck 10 (i.e., to turn to the right and left) and may be further movable in an arc between a generally vertical position and a generally horizontal position. In the lift truck configuration shown, a turn of the steering mechanism 54 to the left would cause the lift truck to turn to the left, and a turn of the steering mechanism 54 to the right would cause the lift truck to turn to the right.

It is to be appreciated that lift trucks are designed in a variety of configurations to perform a variety of tasks. Although the lift truck 50 is shown by way of example as a hand/rider truck, it will be apparent to those of skill in the art that the present invention is not limited to vehicles of this type, and can also be provided in various other types of material handling and lift vehicle configurations, including for example, pallet trucks, stacker trucks, and fore-aft stance operator configuration lift trucks. The systems and methods are suitable for both driver controlled, pedestrian controlled and remotely controlled lift trucks.

Figure 4:
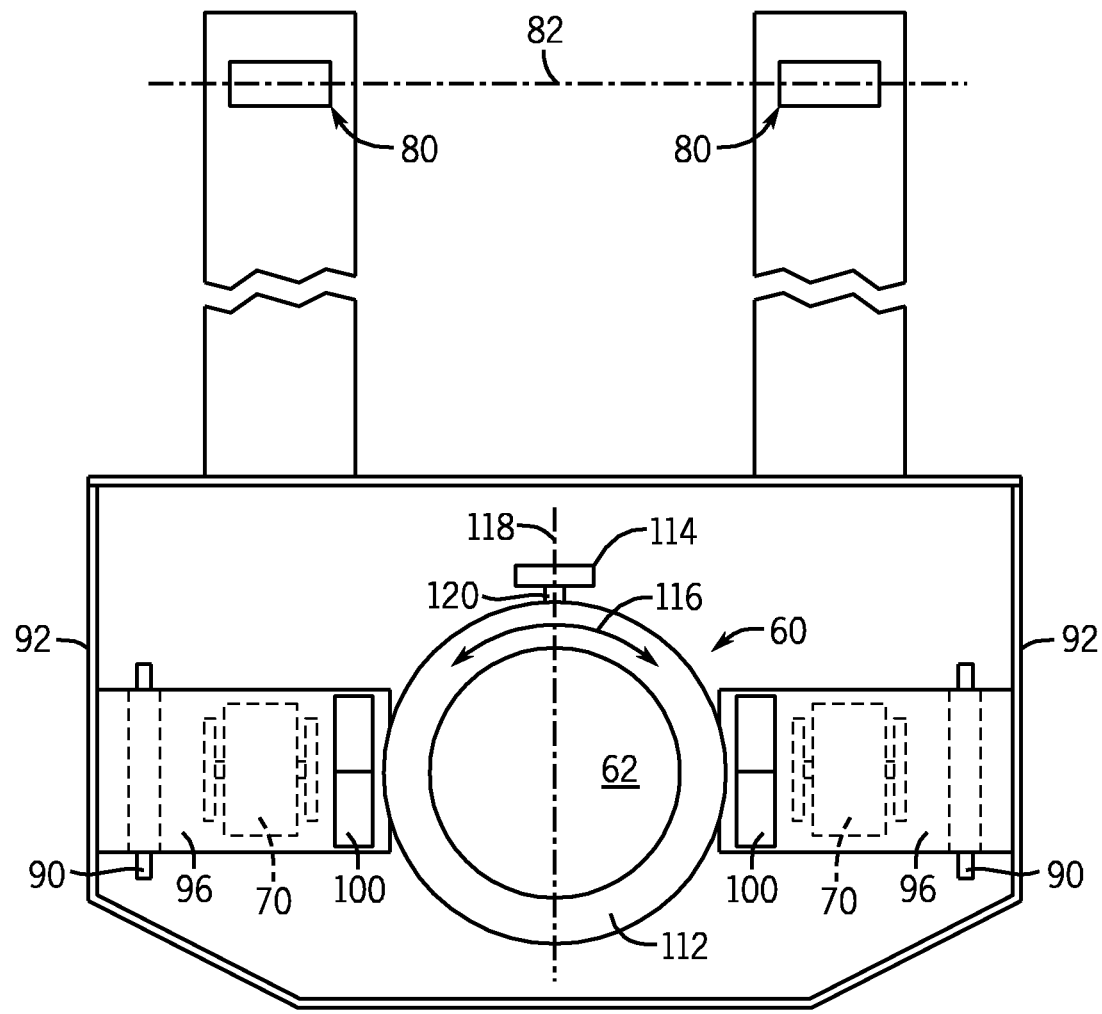
FIG. 4 is a top view of the lift truck of FIG. 3, showing an embodiment of the invention.
Figure 5:
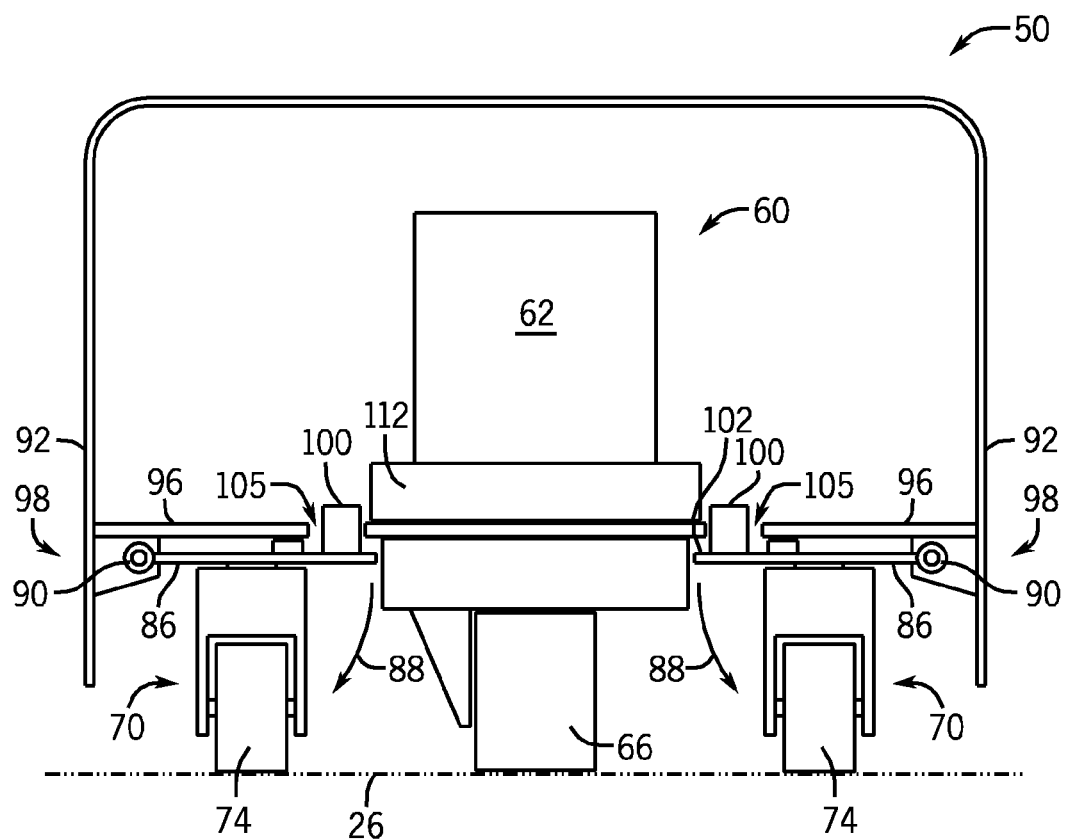
FIG. 5 is a front view of the lift truck of FIG. 3.

Referring to FIGS. 3, 4, and 5, hand/rider type trucks are typically built as five wheel vehicles where two or more load wheels 80 are arranged as a load axle 82, one is the laterally rotating drive unit 60 (including drive tire 66), and the two castors 70 (including caster wheels 74) are used to provide additional stability. The casters may be fixed, spring loaded, and/or shock absorber loaded casters, for example. The load wheels 80 and the drive unit 60 form a typical three-wheeled vehicle stance and the castors 70 are typically placed to the sides of the drive tire 66 to reduce lateral tilting of the truck. The lateral rotation of the drive unit 60 provides the steering function, via the steering mechanism 54, and the castors 70 will turn to follow the truck motion as the truck turns. Embodiments of the invention retain the same basic wheel configuration but modifies the operation of the castors and/or the drive unit in order to improve truck stability when making a turn.

Embodiments of the invention increase the downward pressure of the outside castor wheel 70 when the truck 50 goes into a turn. Doing so will prevent/reduce any tendency of the truck to sway or tilt to the outside. Alternatively, or in combination, tension on the inside caster wheel may be reduced. Embodiments of the invention take advantage of rotation of the drive unit 60, or other parts associated with or affected by steering, to directly trigger the pressure changes on one or the other, or both, castors 70.

Referring now to FIG. 5, each of the castors 70 can be seen mounted to a normally horizontal caster plate 86, such that the castor 70 can pivot down (see arrow 88) towards the floor 26 from a flexible or rotatable connection or mechanism, shown as a hinged connection 90, at or near the outer wall or frame 92 of the truck 50. It is to be appreciated that the hinged connection may be made of flexible material or of moving components. Upward motion of the caster plate 86 may be limited by a stop 96, which may also be an element of the truck frame 92, and may serve to support the drive unit 60. It is contemplated that stops can also be provided to limit the downward motion of the caster plates 86 to a maximum value. Stop 96 and/or caster plate 86 may be incorporated into a bracket 98 mounted to the frame 92 or other parts of the truck 50.

Figure 6A:
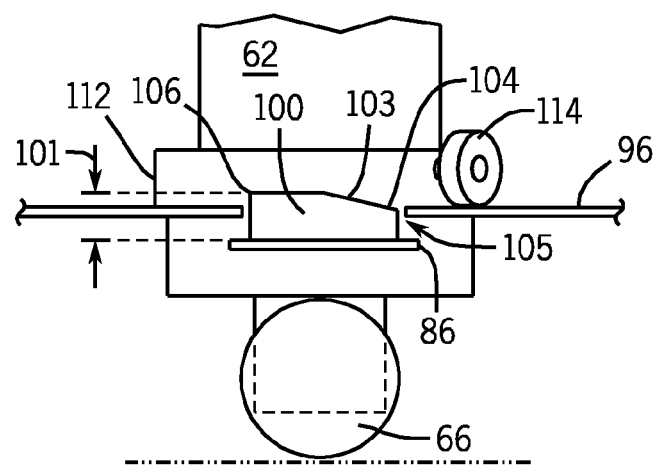
FIGS. 6A and 6B are partial side views of the lift truck of FIG. 5, showing the drive motor and drive tire, along with a bearing and cam configurations.

Each caster plate 86 may have a first slide mechanism, shown as a cam device 100, connected on top surface 102 such that in one embodiment, the cam 100 has a tapered surface 103 tapering upward partially or completely from front 104 to back 106, as best seen in FIG. 6A. Slide mechanisms of different profiles and/or heights and/or orientations are considered for different applications and/or to suit the operator's preferences. For example, slide mechanisms may be horizontally or laterally oriented. Similarly, a height 101 of the cam 100 can be adjusted to provide different responses. If the cam height is made small then the amount of truck tipping would simply be reduced. If the cam height were made large then the truck could actually be made to tip into the turn rather than away from it.

Figure 6B:
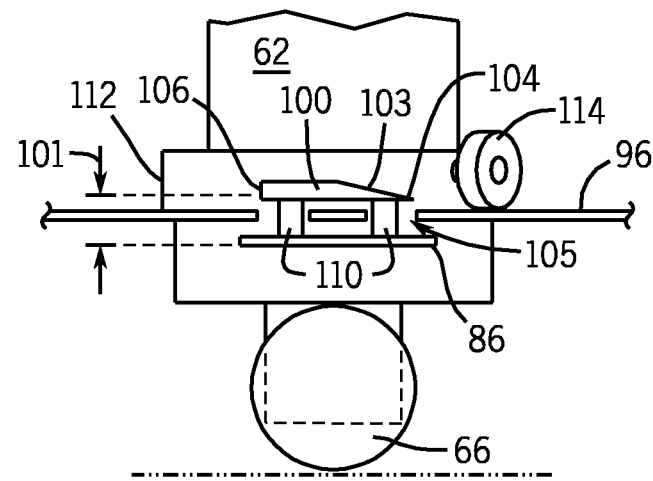

As can be seen in FIGS. 6A and 6B, the cam 100 may extend through an aperture 105 and above the stop 96 (an element of the truck frame 92), with the caster plate 86 positioned below the stop 96. In an embodiment shown in FIG. 6A, the cam 100 may be attached to the caster plate 86 by using welding, rivets, and/or nuts and bolts, as non-limiting examples.

In an embodiment shown in FIG. 6B, the cam 100 may be attached to the caster plate 86 using stand-offs 110, e.g., steel, as a non-limiting example, so as to minimize the size of the aperture 105 in the stop 96 to accommodate the cam 100.

The laterally rotating portion 112 of the truck drive unit 60 may also include a second slide mechanism(s) that make contact with or interact with the first slide mechanism (e.g., cam 100) as the laterally rotating portion 112 is rotated during a turn. In some embodiments, the second slide mechanism comprises a bearing 114 that engages the cam 100, such that the bearing(s) 114 would move about a horizontal axis (see arrow 116 in FIG. 4) projecting out from the center of rotation of the drive unit 60. In one embodiment, a single bearing 114 may be used, and may be placed on the truck centerline 118 on the fixed axle side 120 of the drive unit 60 when the steering mechanism 54 is in a straight ahead position. Having the bearings or cam mechanism mounted to the fixed axle side of the drive unit allows the mechanism to increase the pressure on the outside castor when the truck is turning. It is to be appreciated that other configurations are considered where a bearing(s) or a cam(s) is mounted opposite of the fixed axle side of the drive unit.

Use of a bearing 114 allows for a generally smooth interaction between the cam 100 and the bearing 114 as the laterally rotating portion 112 rotates and the bearing 114 contacts and moves, rolls, and/or slides across the cam surface 103. As the drive unit rotates, the bearing(s) engage the cam 100 on top of the hinged castor wheel, pushing the caster 70 and caster wheel 74 down. This works to prevent the truck from tilting to the outside and keeps the truck more stable. It is to be appreciated that downward pressure on the inside castor may also be reduced in a turn so as to affect movement of one or both the inside and outside caster during a turn.

Figure 7:
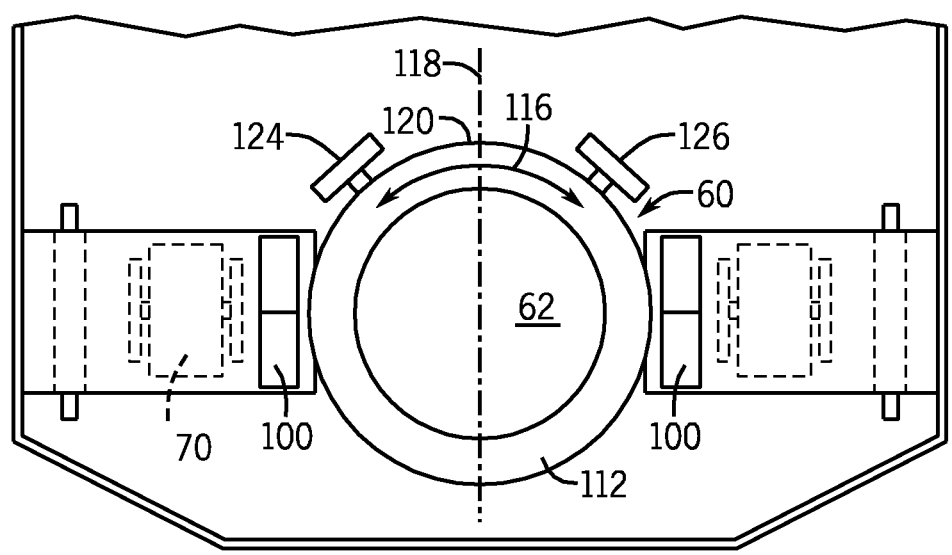
FIG. 7 is a top view of a lift truck, showing an additional alternative embodiment of the invention.

In an alternative embodiment shown in FIG. 7, one or more second slide mechanisms, e.g., bearings 124 and 126, may be used, and they may be placed at a predetermined angle or angles away or offset from the centerline 118 of the truck, again on the fixed axle side 120 of the drive unit 60. Use of two or more bearings 124, 126 projecting out of the drive unit rather than one allows the stabilization process to begin at a smaller turn angle and/or allows for using smaller cams.

Figure 8:
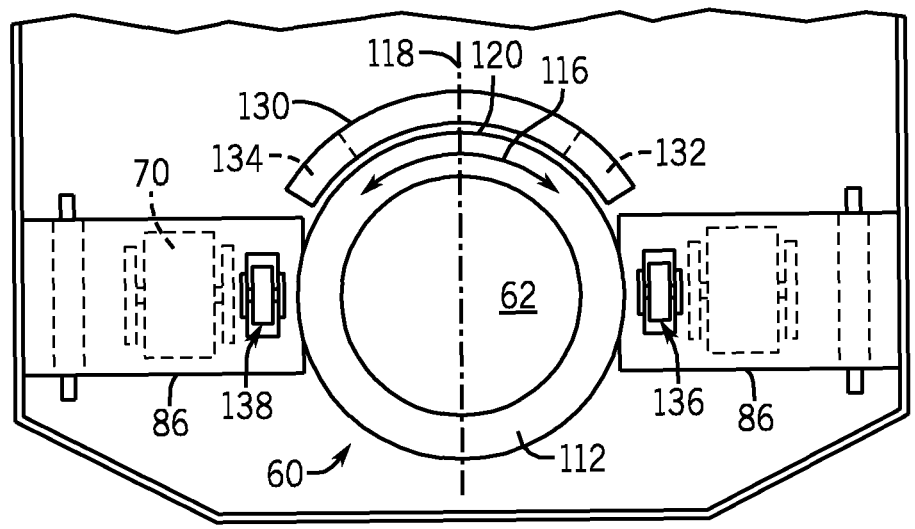
FIG. 8 is a top view of a lift truck, showing yet an additional alternative embodiment of the invention.
Figure 9:
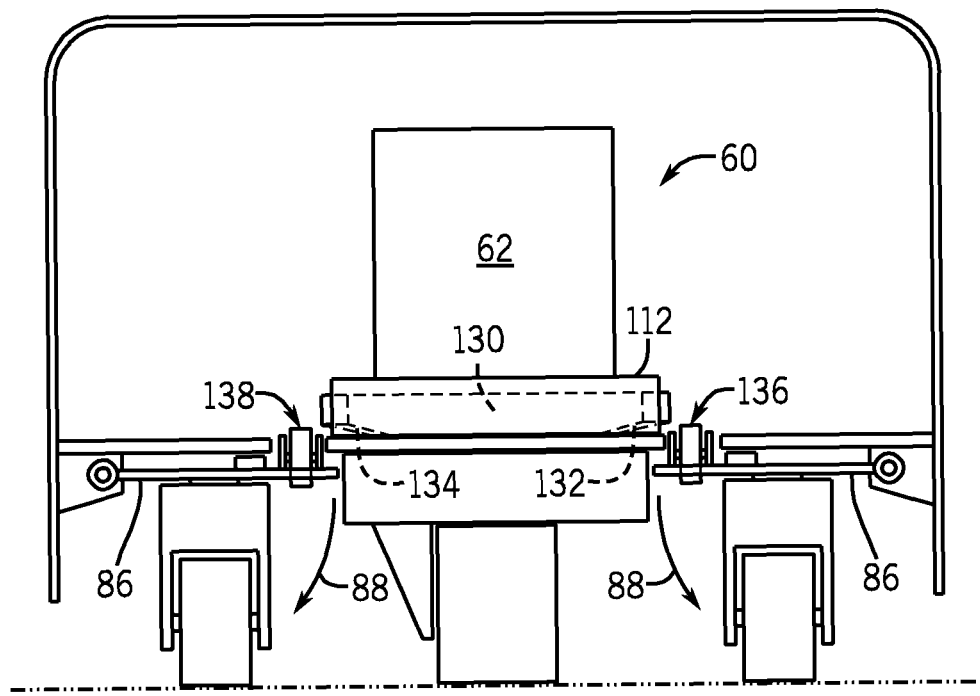
FIG. 9 is a front view of the lift truck of FIG. 8.

In yet an additional alternative embodiment shown in FIGS. 8 and 9, the relative positions of the cam(s) and bearing(s) may be reversed. As can be seen, a single cam 130 is shown coupled to the laterally rotating portion 112 of the truck drive unit 60. The cam 130 includes two tapered surfaces 132 and 134 to engage bearings 136 and 138 respectively. The bearings 136, 138 are positioned on, or in, the caster plate 86. It is to be appreciated that more than one cam may be used in place of the single cam 130. It is also to be appreciated that in any of the embodiments, the first slide mechanism may comprise a cam or bearing, and the second slide mechanism may also comprise a cam or a bearing.

Other embodiments may use a wide range of systems and methods to adjust the truck stability, and each may be used alone or in combination with other stability controls. For example, some embodiments may use an actuator to adjust the caster spring tension in a turn. In this configuration, the caster spring tension may be monitored and controlled to maximize stability.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. Accordingly, this description is meant to be taken only by way of example, and not to otherwise limit the scope of this invention.

I claim:

1. A system for stabilizing a lift truck, the system comprising:
   a rotatable drive unit, the drive unit including a steerable drive tire;
   a first slide mechanism coupled to the rotatable drive unit;
   a caster mounted to a caster plate;
   a second slide mechanism mounted to the caster plate; and
   a steering mechanism coupled to the rotatable drive unit, such that when the steering mechanism is moved to steer the steerable drive tire, the first slide mechanism interacts with the second slide mechanism to affect a pressure on the caster.

2. The system as set forth in claim 1 wherein the caster is an outside caster, and the first slide mechanism interacts with the second slide mechanism to produce a downward pressure on the outside caster.

3. The system as set forth in claim 1 wherein the caster is an inside caster, and the first slide mechanism interacts with the second slide mechanism to reduce a downward pressure on the inside caster.

4. The system as set forth in claim 2 further comprising a hinged connection to connect the caster plate to the lift truck, such that hinged connection allows the downward pressure on the caster to pivot the caster downward toward a floor.

5. The system as set forth in claim 1 wherein the first slide mechanism comprises one of a cam and a bearing, and the second slide mechanism comprises the other of the cam and the bearing.

6. The system as set forth in claim 1 wherein the rotatable drive unit is positioned generally between two casters.

7. The system as set forth in claim 1 the lift truck further comprising a load bearing fork, the load bearing fork including load bearing wheels, the load bearing wheels arranged as a load bearing axle.

8. The system as set forth in claim 7 wherein the first slide mechanism is mounted on the load bearing axle side of the rotatable drive unit.

9. A system for stabilizing a lift truck, the system comprising:
   a rotatable drive unit, the drive unit including a steerable drive tire;
   a left side slide mechanism and a right side slide mechanism coupled to the rotatable drive unit;
   a left caster mounted to a left caster plate;
   a right caster mounted to a right caster plate;
   a left caster slide mechanism mounted to the left caster plate;
   a right caster slide mechanism mounted to the right caster plate; and
   a steering mechanism coupled to the rotatable drive unit, such that when the steering mechanism is moved to turn the lift truck to the left, the right side slide mechanism interacts with the right caster slide mechanism to produce a downward pressure on the right caster.

10. The system as set forth in claim 9 further comprising a left hinged connection to connect the left caster plate to the lift truck; and
   a right hinged connection to connect the right caster plate to the lift truck.

11. The system as set forth in claim 9 wherein a steering mechanism is coupled to the rotatable drive unit.

12. The system as set forth in claim 9 wherein the lift truck comprises a five wheeled lift truck.

13. The system as set forth in claim 9 wherein the rotatable drive unit is positioned generally between the left caster and the right caster.

14. The system as set forth in claim 9 further comprising a load bearing fork, the load bearing fork including load bearing wheels, the load bearing wheels arranged as a load bearing axle.

15. The system as set forth in claim 14 wherein the left slide mechanism and the right slide mechanism are mounted on the load bearing axle side of the rotatable drive unit.

16. A method for stabilizing a lift truck, the method comprising:
   providing a rotatable drive unit, the drive unit including a steerable drive tire;
   providing a first slide mechanism coupled to the rotatable drive unit;
   providing a caster mounted to a caster plate;
   providing a second slide mechanism mounted to the caster plate;
   providing a steering mechanism coupled to the rotatable drive unit, the steering mechanism for steering the steerable drive tire and causing the first slide mechanism to interact with the second slide mechanism; and
   affecting a pressure on the caster.

17. The method as set forth in claim 16 wherein the caster is an outside caster, and affecting the pressure comprises producing a downward pressure on the outside caster.

18. The method as set forth in claim 16 wherein the caster is an inside caster, and affecting the pressure comprises reducing a downward pressure on the inside caster.

19. The method as set forth in claim 16 further comprising allowing the caster plate to pivot downward toward a floor.

* * * * *